United States Patent Office 3,120,218
Patented Feb. 4, 1964

3,120,218
KNOCK SUPPRESSANT
Henry E. Alquist, Bartlesville, Okla., assignor to Phillips Petroleum Company, a corporation of Delaware
Filed Dec. 1, 1961, Ser. No. 156,269
8 Claims. (Cl. 123—1)

This invention relates to suppressing knocking of internal combustion engines. In one aspect the invention relates to method and apparatus for preventing undesirable knocking of an internal combustion engine by continuously determining a variable represenative of the composition of the fuel and varying either the fuel-air ratio or the spark advance of the engine. In another aspect the invention relates to a method for operating an internal combustion engine, including the steps of determining the outside air temperature and controlling either the fuel-air ratio or the spark advance to reduce the tendency for engine knocking. In another aspect this invention relates to a method for operating an internal combustion engine, including the steps of continuously measuring the thermal conductivity of the fuel supplied and varying either the fuel-air ratio or the spark advance of the engine in response thereto to reduce the tendency for engine knocking. Another aspect of this invention relates to an internal combustion engine assembly including, in addition to the engine, means for continuously measuring the outside air temperature and for varying either the fuel-air ratio or the spark advance in response thereto. In another aspect this invention relates to an internal combustion engine assembly including, in addition to the engine, means to continuously measure the thermal conductivity of the fuel supplied to the engine and to vary either the fuel-air ratio or the spark advance of the engine to reduce the tendency for knocking.

Natural gas is widely used as a combustion fuel in heating applications and therefore is widely available and, since it is also an efficient engine fuel, is widely used as a fuel for stationary internal combustion engines. During periods of peak demand, in many instances the supply of natural gas is supplemented by the addition of a vaporized, readily-liquefiable petroleum gas such as propane, which necessitates a variation in the operating conditions of the engine to maintain most efficient operation at all times with a minimum of undesirable knocking.

An object of this invention is to provide efficient operation of internal combustion engines with minimum tendency for knocking.

Another object of this invention is to operate a stationary internal combustion engine with a fuel which varies in composition, at high efficiency with a minimum tendency for knocking.

Another object of this invention is to provide efficient operation of a stationary gas engine without damaging knocking, utilizing as a fuel a natural gas stream to which varying quantities of propane are added during periods of peak shaving.

Other aspects, objects and the advantages of my invention are apparent in the written description, the drawing and the claims.

According to my invention, a variable representing the composition of the fuel is determined continuously and an operating variable of the engine adjusted to reduce the tendency for knocking. I have found that, where peak shaving is accomplished according to a predetermined schedule based on outside air temperature, outside temperature is a variable representative of the composition of the fuel and that the control of an operating variable can be made in response thereto to reduce knocking tendency. I have also found that the thermal conductivity of the fuel stream can be correlated with fuel composition to provide a suitable reference for control. Either the fuel-air ratio or the spark advance of the engine can be adjusted to provide the desired control.

One of the more important uses of natural gas is as a combustion fuel. It is extensively used in heating applications for residential, commercial and industrial buildings. Throughout most of the United States such natural gas usage is seasonal and therefore creates a nonuniform demand upon the dispensing and storing facilities of a municipal natural gas utility. Natural gas is generally transported to municipalities through underground pipe lines which frequently extend hundreds of miles from the natural gas source.

The cost of transporting, storing, and handling natural gas in quantities sufficient to sustain the maximum requirements of a community is frequently prohibitive. This becomes obvious when one considers that the peak demand generally occurs only a few months out of the year, resulting in a situation when only a small fraction of the gas system capacity is utilized during the remainder of the year. Therefore, unless convenient underground storage facilities are available in which natural gas can be accumulated and stored in the summer months for use in the winter months, gas distribution companies often employ peak shaving.

Peak shaving is the practice of augmenting a municipal natural gas supply with liquefied petroleum gas during cold weather when the demand is high and the natural gas system cannot, by itself, meet this demand. The liquefied petroleum gas, commonly called LPG, is easily transported and stored and is, therefore, readily available for such more or less emergency usage.

The heating value of LPG, which is principally propane, is substantially higher than that of natural gas, which is principally methane. To retain a consistent caloric value of about 1000 B.t.u. per standard cubic foot, even while the natural gas is being increasingly diluted with LPG, an appropriate quantity of air also is injected into the supply. Thus, by using a carefully controlled method of blending and testing, such as that described by U.S. 2,682,884, the caloric value of the fuel is kept constant so as not to disturb the various types of combustion heating equipment which use this fuel. The amount of air added to the system, incidentally, is never sufficient to produce an explosive mixture.

However, when the LPG-air diluted gas is used to operate a gas engine, its operation is significally different from operation with the undiluted natural gas in that there is an increased tendency to knock. The severity of the knock and its destructive effects will, of course, be proportional to the amount of propane in the fuel and the length of time the knocking is allowed to continue.

One of the inherent properties of an internal combustion fuel is the maximum compression ratio at which it can be ignited without detonation, known as knock-limited compression ratio. Although high compression ratio operation is desirable for increased engine efficiency, beyond the knock-limited ratio, engine operation is not practical.

For example, a gas engine with a compression ratio as high as 15.5 may be operated (ASTM Research Method Operating Conditions) with methane fuel at a fuel-air ratio of 0.060–0.070. Operation of such an engine under these conditions with propane, on the other hand, would not be practical because the knock-limited compression ratio for propane at that fuel-air ratio is 9.7. Obviously then, if a gas engine operating on natural gas (essentially methane) were suddenly fueled with a mixture comprising significant amounts of propane, the engine would knock.

To eliminate the knock would require significant adjustment of the controls of the engine. For example, changing the fuel-air ratio to a value approaching 0.085–

0.095 would eliminate the knock since at that fuel-air ratio the knock-limited compression ratio for propane (ASTM Research Method Operating Conditions) is 16.0. Conversely, a change in fuel from propane back to methane would again require engine adjustment for efficient operation.

My invention, therefore, deals with a method of automatically correcting the operating conditions of such an engine to correspond with changes in the fuel over which the engine operators have no control, for example, automatically increasing the fuel-air ratio with each increase in the propane-air content of the natural gas fuel. This change in fuel composition can be detected in any of several ways.

One means utilizes a fuel-air ratio controller activated by signals from an ambient temperature sensor. This relationship of ambient temperature with fuel composition is based upon the practice of many gas utilities of injecting peak shaving gas according to the ambient outdoor temperature. Because experience has shown that gas demand is a function of the weather, the utility, for example, begins such injection at about 25–30° F. and increases the propane-air addition as the temperature decreases. Such a schedule of temperature and supplementary gas injection is frequently sufficiently uniform so that the ambient external temperature is a measure of the propane-air content of the gas offered by the utility.

Another technique involves the use of a thermal conductivity detector in the fuel system just prior to its point of entry at the engine. Using the difference in the thermal properties of natural gas and LPG-air, the conductivity element will detect the presence and quantity of propane-air and can be made to supply an appropriate signal to the fuel-air ratio control.

Figure 1:
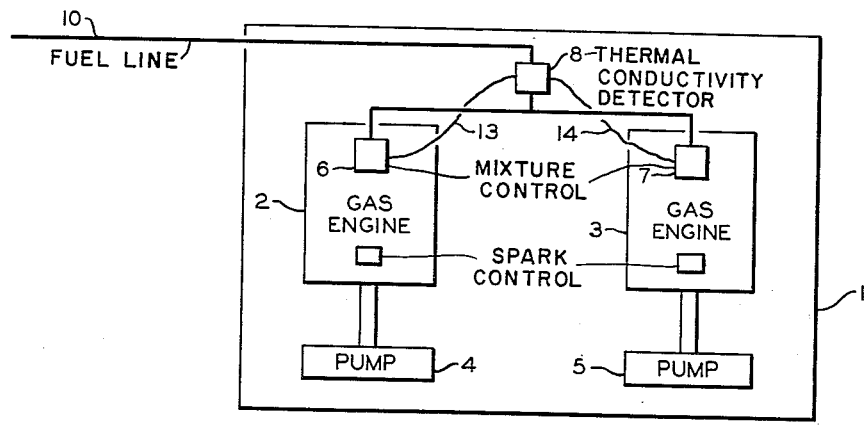
FIGURE 1 is a diagrammatic representation of an embodiment in which the mixture controls are adjusted in response to thermal conductivity.

In FIGURE 1 there are illustrated twin gas engines 2 and 3, which power pumps 4 and 5 and are enclosed within pumphouse 1. The fuel-air ratio controllers 6 and 7 are activated by a thermal conductivity detector 8, which sends its signal by means of conduits 13 and 14. Thermal conductivity detector 8 responds to the fuel in inlet gas line 10.

Figure 2:
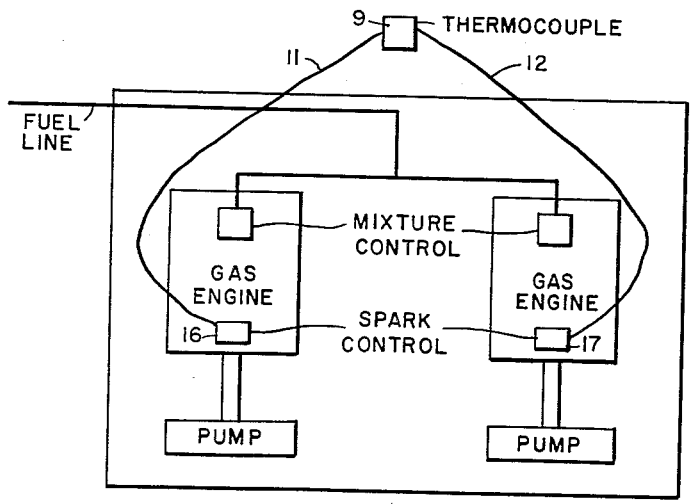
FIGURE 2 is a diagrammatic representation of an embodiment in which spark controls are adjusted in response to an outside temperature measurement.

In FIGURE 2 controllers 16 and 17 are adjusted in response to an external thermocouple 9 which sends a continuous signal by means of conduits 11 and 12 to the spark controllers 16 and 17.

Figure 3:
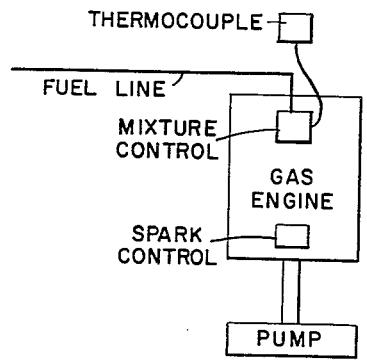
FIGURE 3 is a diagrammatic representation of an embodiment in which a mixture control is adjusted in response to a thermocouple.

In FIGURE 3 a thermocouple, similar to thermocouple 9, outside the pumphouse, sends a continuous signal to the mixture control to adjust in accordance with outside temperatures.

Figure 4:
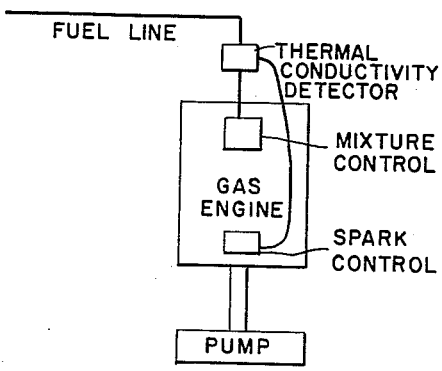
FIGURE 4 is a diagrammatic representation of an embodiment in which a spark control is adjusted in response to thermal conductivity.

In FIGURE 4 a thermal conductivity detector similar to detector 8 sends a signal to the spark control of the gas engine.

Whichever technique is used, the fuel-air ratio controller instrumentation is adjusted to provide fuel-air ratios in the approximate range from 0.06 to 0.10. The fuel-air ratio need not be increased beyond 0.10 no matter how low the ambient temperature or how rich the fuel is in propane. The specific apparatus comprising thermocouples, thermal conductivity elements, fuel-air ratio controllers, gas engines, etc. are not part of this invention and their specific choice, installation and use, including calibration to achieve optimum conditions, are well within the scope of their respective art.

For example, where ambient temperature is the controlling variable, suitable apparatus comprises a plain type mercury-filled bulb thermometer for remote location, as described in Minneapolis Honeywell Catalog 6709 (September 1953); a Series No. 602P Recording Pneumatic Controller with Air-O-Line Control Action, also illustrated in the above catalog; and a Bellows Type Grad-U-Motor Power Unit Model No. M0900A, as shown in Minneapolis-Honeywell Catalog 8305–R. This motor can be used to adjust a fuel-air regulator, or to adjust the spark advance.

In actual operation, the fuel-air ratio may be adjusted by movement of an air-throttling plate. When a higher fuel-air ratio is required, the position of the air-throttling plate is changed to restrict the air intake, generally resulting in a slight loss of power. However, this condition is generally only momentary. A conventional feature of stationary gas engines is a power-controlled fuel valve which is responsive to the power requirement of the operation its is performing. Thus, when the slight loss of power is detected the power-controlled fuel valve performs its specific function and restores the engine to the desired operating level by increasing the fuel flow. The spark advance can be adjusted by utilizing a mechanical linkage between the control motor and means to rotate the ignition distributor.

Where thermal conductivity is the controlling variable, suitable apparatus comprises an Assembly List No. 7802–W–A16 Leeds & Northrup Thermal Conductivity Gas Analyzer Assembly, as described in Leeds & Northrup Folder ND46–91(6)65–856; an Assembly List No. 54513–20–C16 Pneumatic Controller, also in the above folder; and a Bellows Type Grad-U-Motor Power Unit Model No. M0900A, as shown in Minneapolis-Honeywell Catalog 8305–R. As with control by ambient, either the fuel-air ratio or the spark advance can be adjusted.

Reasonable variation and modification are possible within the scope of my invention which sets forth method and apparatus for operating an internal combustion engine efficiently with a varying fuel composition without knocking.

I claim:

1. A method for operating an internal combustion engine which comprises supplying a stream of fuel comprising natural gas to which liquefied petroleum gas is added in predetermined amounts at predetermined outside air temperatures to said engine, continuously determining the outside air temperature unaffected by engine operation, and controlling the fuel-air ratio supplied to said engine in response to said measured temperature to reduce the tendency for engine knocking.

2. A method for operating an internal combustion engine which comprises supplying a stream of fuel comprising natural gas to which liquefield petroleum gas is added in predetermined amounts at predetermined outside air temperatures to said engine, continuously determining the outside air temperature unaffected by engine operation, and adjusting the spark advance of said engine in response to said measured temperature to reduce the tendency for engine knocking.

3. A method for operating an internal combustion engine which comprises supplying a stream of fuel comprising natural gas to which liquefied petroleum gas is added during periods of high demand to said engine, continuously measuring the thermal conductivity of said fuel, mixing said fuel with air and feeding said mixture to said engine, and controlling the fuel-air ratio of said mixture in response to said measured thermal conductivity to reduce the tendency for engine knocking.

4. A method for operating an internal combustion engine which comprises supplying a stream of fuel comprising natural gas to which liquefied petroleum gas is added during periods of high demand to said engine, continuously measuring the thermal conductivity of said fuel, mixing said fuel with air to supply a mixture to said engine, continuously controlling the spark advance of said engine in response to said measured thermal conductivity to reduce the tendency for engine knocking.

5. An internal combustion engine assembly comprising an internal combustion engine, means for supplying a stream of fuel comprising natural gas to which liquefied petroleum gas is added in predetermined amounts at predetermined outside air temperatures to said engine, means for mixing air with said fuel prior to the introduction into said engine, means to measure continuously the outside air temperature unaffected by engine operation, and control means responsive to said measured temperature to vary the fuel-air ratio of said engine responsive to said measured outside temperature.

6. An internal combustion engine assembly comprising means for supplying a stream of fuel comprising natural gas to which liquefield petroleum gas is added in predetermined amounts at predetermined outside air temperatures to said engine, means for continuously measuring the outside air temperature unaffected by engine operation, and means for varying the spark advance of said engine responsive to said outside temperature to reduce the tendency for engine knocking.

7. An internal combustion engine assembly comprising means for supplying a stream of fuel comprising natural gas to which liquefield petroleum gas is added during periods of high demand to said engine, means for adding air to said fuel to produce a fuel-air mixture prior to introduction into said engine, means for continuously measuring the thermal conductivity of said stream of fuel, and means responsive to said measured thermal conductivity to vary the fuel-air ratio of said engine to reduce the tendency for engine knocking.

8. An internal combustion engine assembly comprising means for supplying a stream of fuel comprising natural gas to which liquefied petroleum gas is added during periods of high demand to said engine, means for continuously measuring the thermal conductivity of said fuel, and means to vary the spark advance responsive to said measured thermal conductivity to reduce the tendency for engine knocking.

References Cited in the file of this patent

UNITED STATES PATENTS

| | | |
|---|---|---|
| 2,244,669 | Becker | June 10, 1941 |
| 2,245,562 | Becker | June 17, 1941 |
| 2,670,724 | Reggio | June 12, 1945 |
| 2,739,577 | Moulton | Mar. 27, 1956 |
| 2,927,569 | Grauel | Mar. 8, 1960 |
| 2,972,988 | Ranck | Feb. 28, 1961 |
| 3,016,886 | Benz et al. | Jan. 16, 1962 |